(12) United States Patent
Syed et al.

(10) Patent No.: US 11,014,482 B1
(45) Date of Patent: May 25, 2021

(54) PASSIVE HEAD RESTRAINT INSERT FOR A VEHICLE SEAT ASSEMBLY

(71) Applicant: Lear Corporation, Southfield, MI (US)

(72) Inventors: Ike Syed, Royal Oak, MI (US); Joshua Hallock, Warren, MI (US); Timothy Krause, Wolverine Lake, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/798,710

(22) Filed: Feb. 24, 2020

(51) Int. Cl.
*B60N 2/882* (2018.01)
*B60N 2/68* (2006.01)
*B60N 2/60* (2006.01)

(52) U.S. Cl.
CPC .......... *B60N 2/882* (2018.02); *B60N 2/6027* (2013.01); *B60N 2/682* (2013.01)

(58) Field of Classification Search
CPC ................................ B60N 2/803; B60N 2/882
See application file for complete search history.

(56) References Cited

U.S. PATENT DOCUMENTS

| | | | |
|---|---|---|---|
| 10,011,204 B2 | 7/2018 | Line et al. | |
| 2017/0210257 A1* | 7/2017 | Kondrad | B60N 2/502 |
| 2018/0037146 A1* | 2/2018 | Line | B60N 2/682 |
| 2018/0186259 A1* | 7/2018 | Line | B60N 2/68 |
| 2018/0186260 A1 | 7/2018 | Kondrad et al. | |

FOREIGN PATENT DOCUMENTS

| | | | | |
|---|---|---|---|---|
| CA | 2824811 A1 | * | 9/2012 | ............ B60N 2/80 |
| DE | 3002235 A1 | * | 8/1980 | ............ B60N 2/882 |
| DE | 4112220 A1 | * | 10/1992 | ............ B60N 2/882 |
| DE | 102010049084 A1 | * | 4/2012 | ............ B60N 2/803 |
| DE | 102013225477 A1 | * | 3/2015 | ............ B60N 2/20 |
| EP | 2902273 A1 | * | 8/2015 | ............ B60N 2/688 |
| FR | 2760417 A1 | * | 9/1998 | ............ B60N 2/882 |
| JP | 2003111640 A | * | 4/2003 | ............ B60N 2/879 |
| WO | WO-2005118336 A1 | * | 12/2005 | ........... B60N 2/7011 |
| WO | WO-2015154097 A2 | * | 10/2015 | ............ B60N 2/803 |
| WO | 2017047308 A1 | | 3/2017 | |

* cited by examiner

*Primary Examiner* — Timothy J Brindley
(74) *Attorney, Agent, or Firm* — Brooks Kushman P.C.

(57) ABSTRACT

A vehicle seat assembly and a method of forming the assembly are provided. The assembly has a seat back frame with a flange extending into an opening. A head restraint insert has an insert body to be received by the opening and forming a mounting surface. A trim cover receives the head restraint insert, and is positioned between the mounting surface and the flange of the seat back frame when the head restraint insert is connected to the seat back frame. An assembly is provided with an insert body forming a mounting face, a retainer extending outwardly from the insert body to form a channel with the mounting face, and a trim cover sized to receive the insert body and having an edge trim extending to cooperate with a lip on a frame to retain the assembly to the frame.

20 Claims, 3 Drawing Sheets

PASSIVE HEAD RESTRAINT INSERT FOR A VEHICLE SEAT ASSEMBLY

TECHNICAL FIELD

Various embodiments relate to a vehicle trim element, such as a passive head restraint insert, for a vehicle component, such as a vehicle seat assembly.

BACKGROUND

A vehicle seat assembly may be provided with a head restraint insert or other vehicle trim component. Examples of a head restraint insert and vehicle seat assembly may be found in PCT Publication No. WO 2017/047308 A1, U.S. Pat. No. 10,011,204 B2, and U.S. Patent Publication No. 2018/0186260 A1.

SUMMARY

In an embodiment, a vehicle seat assembly has a seat back frame surrounding an opening, with the seat back frame forming a flange extending into the opening. A head restraint insert has an insert body sized to be at least partially received by the opening, with the insert body forming a mounting surface. A trim cover is sized to receive the head restraint insert such that the trim cover extends over a seating surface side of the insert body of the head restraint insert and the mounting surface. The trim cover is positioned between the mounting surface and the flange of the seat back frame when the head restraint insert is connected to the seat back frame.

In a further embodiment, the trim cover has an edge trim extending about a portion of an outer perimeter region of the trim cover.

In an even further embodiment, the seat back frame forms a lip extending away from the opening. The lip extends about a portion of opening, and the lip is opposite to the flange across the opening. The edge trim is received by the lip to retain the trim cover to the seat back frame.

In another even further embodiment, the trim cover is retained in position by the head restraint insert and the seat back frame without fasteners extending through the trim cover and into the head restraint insert.

In a further embodiment, the head restraint insert has a retainer extending outwardly from the insert body. The mounting surface and the retainer define a channel therebetween. The flange of the seat back frame is received within the channel.

In an even further embodiment, the head restraint insert has a mounting frame with a first portion forming the retainer, and a second portion positioned inside the insert body to retain the mounting frame relative to the insert body.

In even yet further embodiment, the mounting frame is formed from an elongated bar. The second portion of the mounting frame is formed by a first end region and a second end region of the elongated bar. The first portion is formed by an intermediate region of the elongated bar.

In a further even yet further embodiment, the intermediate region forms a U-shape.

In another further even yet further embodiment, the mounting frame is formed from metal.

In another even further embodiment, the retainer is formed by a first retainer portion and a second retainer portion. The first retainer portion is spaced apart from and aligned with the second retainer portion. The first retainer portion and the second retainer portion cooperate with the mounting surface to define the channel therebetween. The flange of the seat back frame is received within the channel such that the first retainer portion and the second retainer portion engage the surface of the flange.

In an even further embodiment, the insert body has at least one projection extending outwardly therefrom, with the at least one projection spaced apart from the retainer. The at least one projection is received by the opening and engages the seat back frame to retain the head restraint insert relative to the seat back frame.

In an even further embodiment, the retainer is formed from plastic, and is integrally formed with the insert body.

In another further embodiment, the insert body is formed from plastic.

In an even further embodiment, the insert body is formed from expanded polypropylene (EPP).

In another embodiment, an assembly has an insert body sized to be at least partially received within an opening of a frame. The insert body forms a mounting face extending around at least a portion of the insert body. A retainer extends outwardly from the insert body, with the retainer spaced apart from the mounting face to form a channel therebetween. The channel is sized to receive a flange of the frame to retain the assembly to the frame. A trim cover is sized to receive the insert body such that the trim cover extends over a first side of the insert body and the mounting face. The trim cover has an edge trim extending about a portion of an outer perimeter region of the trim cover to cooperate with a lip on the frame to retain the assembly to the frame. The edge trim is positioned opposite to the retainer.

In a further embodiment, the trim cover is retained in position relative to the insert body without fasteners extending through the trim cover and into the insert body.

In another further embodiment, the insert body is formed from plastic, and the retainer is formed from metal. A portion of the retainer is embedded into the insert body to connect the retainer to the insert body.

In an even further embodiment, the retainer is formed from an elongated bar. The elongated bar has a first end region and a second end region embedded in the insert body, and an intermediate region extending away from the insert body to form the retainer.

In an embodiment, a method of forming an assembly with a trim component is provided. A support frame is provided with a flange extending into an opening surrounded by the support frame. The support frame forms a lip extending away from the opening, with the lip spaced apart from the flange. An insert is provided with an insert body and a retainer extending outwardly from the insert body. The insert body is provided with a mounting surface, with the mounting surface and the retainer to defining a channel therebetween. At least a portion of the insert is inserted into a trim cover such that the trim cover extends over the mounting surface and an outer side of the insert body. The insert is connected to the support frame by positioning the flange of the support frame into the channel of the insert with the trim cover positioned between the flange and the mounting surface, and rotating the insert towards the support frame until at least a portion of the insert is received by the opening and the retainer engages a surface of the flange. The trim cover is extended over at least a portion of the support frame such that an edge trim provided in the trim cover engages the lip of the support frame.

In a further embodiment, providing the insert includes forming the insert by positioning the retainer into a mold, and injecting material into the mold to form the insert body such that a portion of the retainer is embedded into the insert body.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure and invention.

Figure 1:
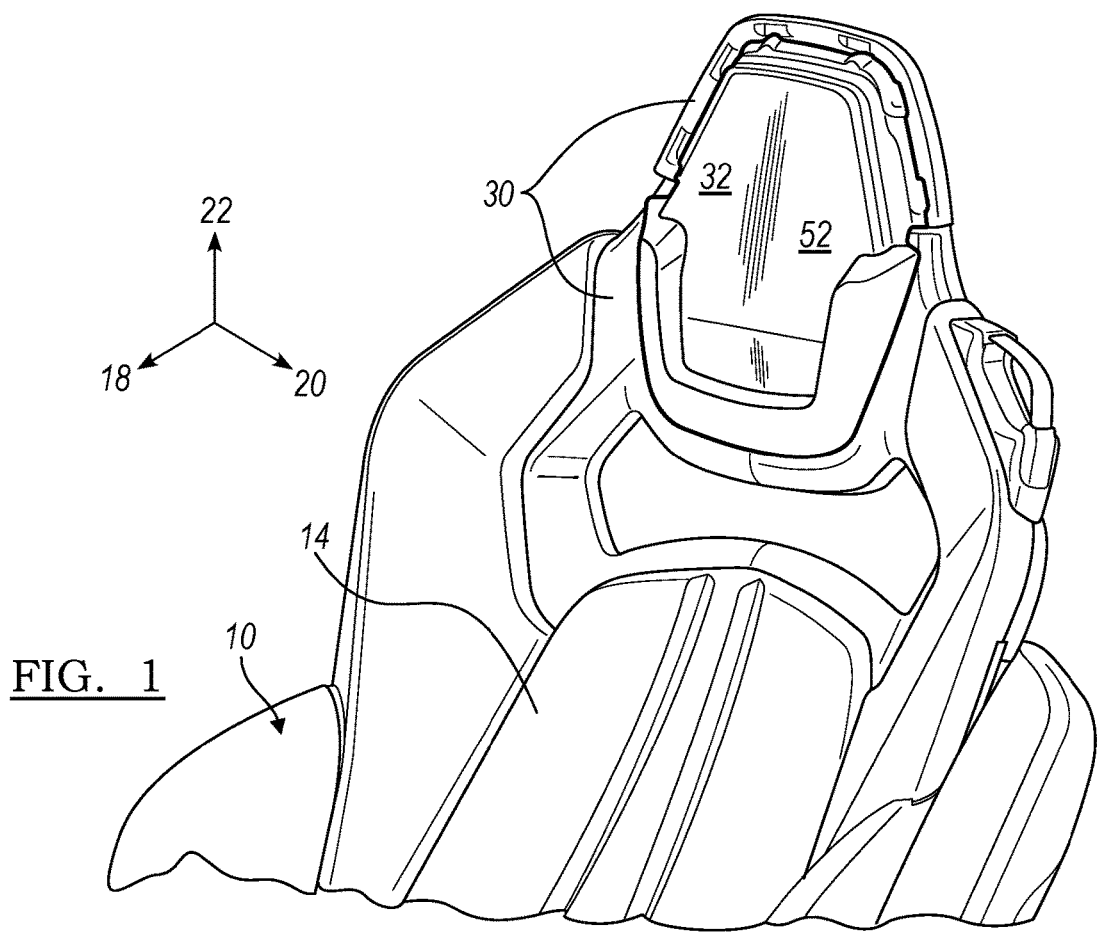
FIG. 1 illustrates a partial perspective view of a vehicle seat assembly according to the present disclosure.

FIG. 1 illustrates a portion of a vehicle seat assembly 10 with first and second seat members, such as a seat base and a seat back 14, respectively, that cooperate to form a seating surface for a vehicle occupant. The vehicle seat assembly has a longitudinal axis 18, a transverse axis 20, and a vertical axis 22 that correspond generally to a vehicle coordinate system when the seat assembly 10 is installed.

Each seat member is formed by a structural frame 30 that supports one or more cushion elements 32 that are covered by associated trim elements 34 (illustrated below with reference to FIGS. 4-5). In one example, the structural frame 30 is formed from a metal or metal alloy, or other structural material. In further examples, the structural frame may additionally or alternatively include plastic, such as a structural or reinforced plastic. The frame 30 may additionally or alternatively include composite materials, such as a fiber reinforced polymer, fiber reinforced carbon material, or the like. The cushion elements 32 are formed from a plastic, such as a foam or other similar material, and in one example, may be formed from an expanded polypropylene (EPP). The trim elements 34 are formed from a fabric, and as used herein, fabric may refer to various fabrics used in vehicle interiors, and includes cloth, vinyl, leather, faux leather, and the like.

In the present example, the vehicle seat back frame 30 forms the frame or support frame, and the head restraint insert 32 forms the insert. In the present example, the vehicle seat assembly is provided with a passive head restraint, e.g. the head restraint insert 32 does not move and is not adjustable relative to the seat back and the vehicle seat assembly once the head restraint insert in installed.

However, it is also envisioned that other vehicle interior trim components may be formed and attached as described herein with reference to the head restraint insert and vehicle seat back frame. For example, the vehicle seat back frame may be provided by another frame or support frame in a vehicle or a vehicle seat assembly. Likewise, the head restraint insert may be provided as another insert for the vehicle or vehicle seat assembly that connects to the support frame as described herein, and with a corresponding trim component.

Figure 2:
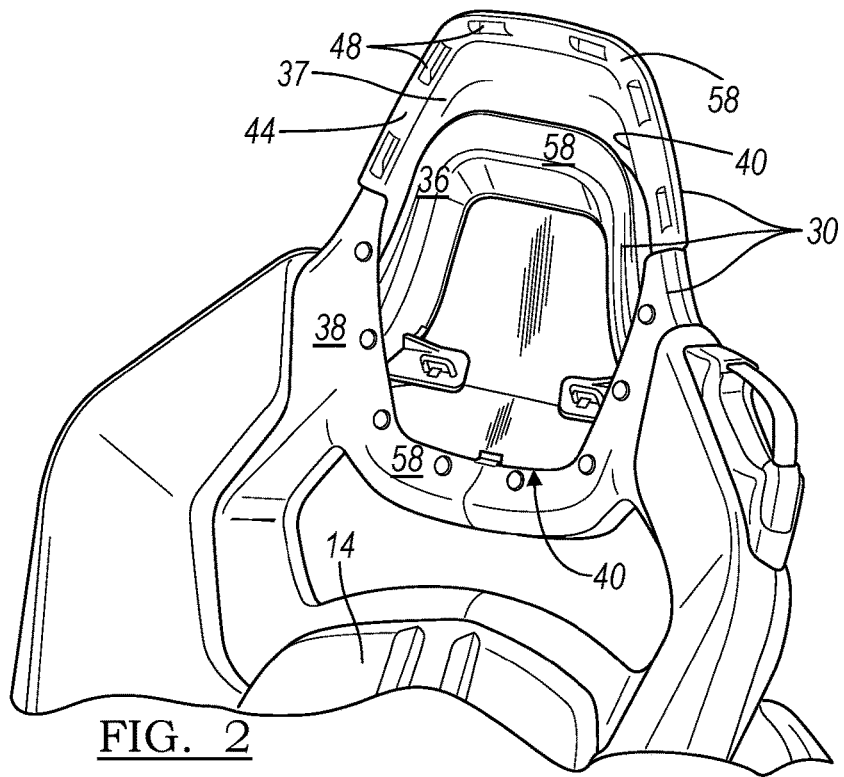
FIG. 2 illustrates a partial perspective view of a seat back frame of the vehicle seat assembly of FIG. 1.
Figure 5:
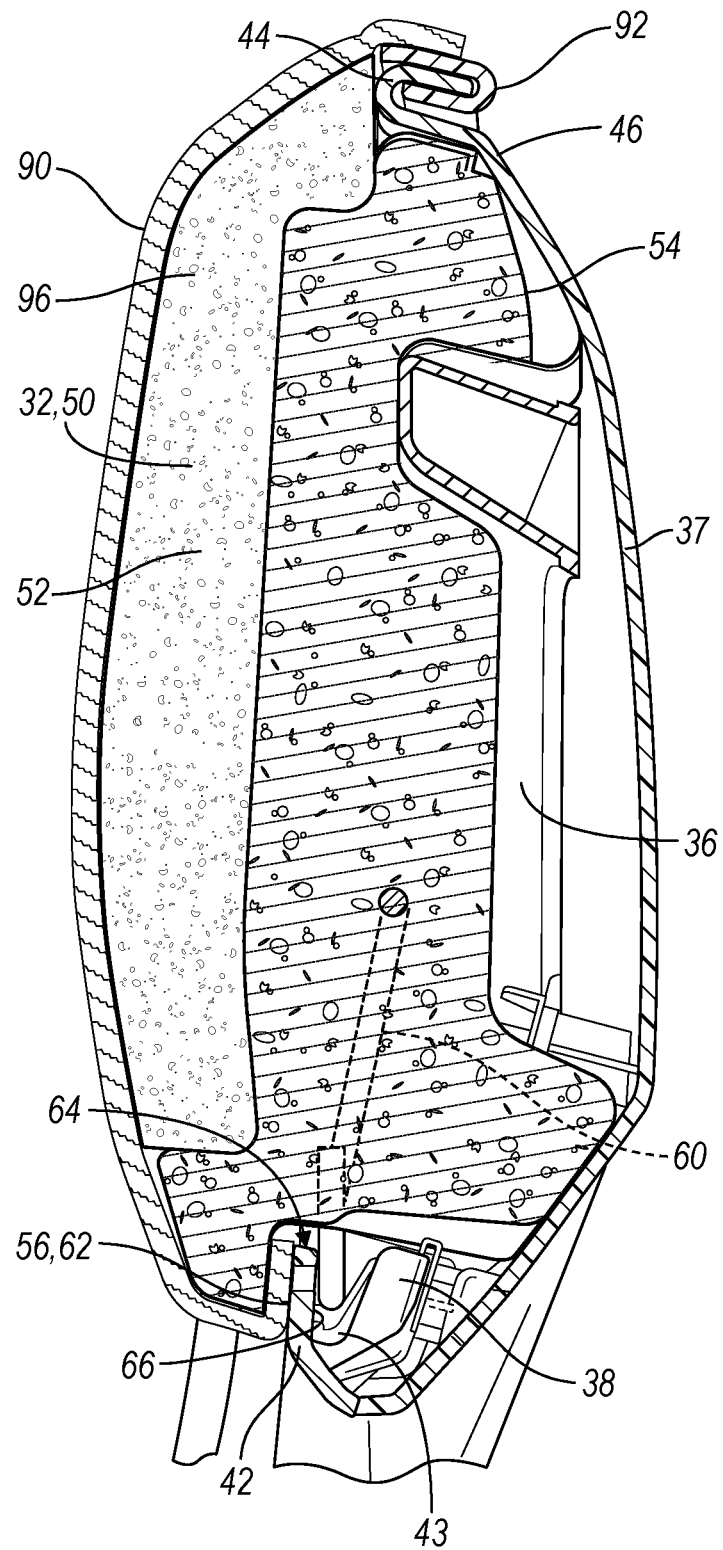
FIG. 5 illustrates a partial side sectional view of the vehicle seat assembly of FIG. 1 with a trim cover.

As shown in FIGS. 2 and 5, the seat back 14 has a seat back frame 30 surrounding an opening 40. The seat back frame 30 may extend continuously around the opening 40. The frame 30 may include multiple frame components that are assembled or connected to one another to define the opening 40. In the example shown, the frame 30 has a structural frame member 36, a rear cover 37, and a front surround 38, as shown. The opening 40 may be positioned at an upper end region of the seat back frame 14, e.g. opposite to the seat base. In one example, the opening 40 is positioned at a location corresponding to the location of a head of an occupant of the vehicle seat assembly 10.

The seat back frame forms a flange 42 extending into the opening 40. The flange 42 may extend generally vertically within the seat back frame 14, with the seat back frame in an upright position. As used herein, generally may refer to an angle within ten degrees, within fifteen degrees, or within twenty degrees of the stated angle. The flange 42 may extend transversely across the opening 40. In the example shown, the flange 42 is formed by the front surround 38 of the frame 30. In a further example, and as shown in FIG. 5, the flange 42 of the frame 30 also forms a recess 43. The recess 43 may be used as a guide when connecting the head restraint insert 32 to the frame 30.

The seat back frame 30 also forms a lip 44 extending away from the opening 40. The lip 44 extends about a portion of the perimeter of the opening 40. The lip 44 may additionally extend generally rearwardly relative to the seat back frame in an upright position. The lip 44 may be curved or otherwise shaped to follow the perimeter of the opening 40. The lip therefore defines a continuous groove 46 as shown in FIG. 5. In one example, the lip 44 is positioned to be opposite to the flange 42 across the opening 40. In the example shown, the lip 44 is formed by the rear cover 37 of the frame 30.

In some examples, the frame 30 may additionally define a series of pockets 48. The pockets 48 may be spaced apart from one another about a portion of the perimeter of the opening 40, and may be positioned adjacent to the lip 44. In the example shown, the pockets 48 are formed by the rear cover 37 of the frame 30.

Figure 3:
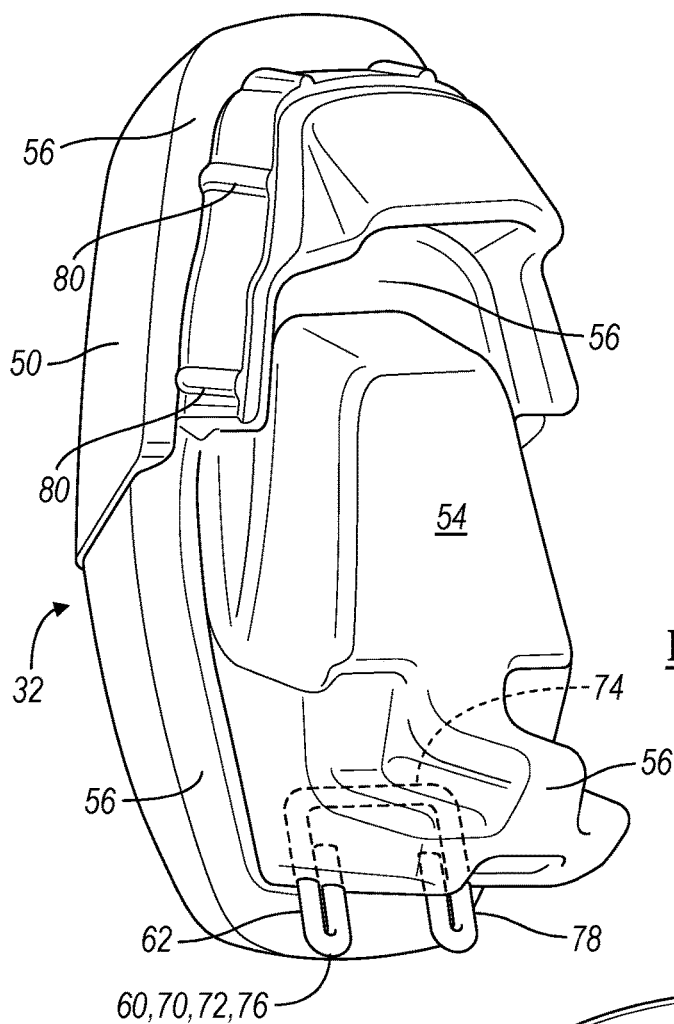
FIG. 3 illustrates a rear perspective view of a head restraint insert for use with the vehicle seat assembly of FIG. 1.

As shown in FIGS. 1, 3, and 5, a head restraint insert 32 is provided for use with the vehicle seat assembly 10 and frame 30. In one example, the head restraint insert 32 may be provided as a passive head restraint insert, such that it is not adjustable relative to the seat back frame 30, the seat back 14, and vehicle seat assembly 10.

The insert 32 has an insert body 50. The insert body 50 is sized to be at least partially received by the opening 40 of the seat back frame 30. The insert body 50 has an outer, seating surface side 52 as shown in FIG. 1, and an inner side 54 generally opposite to the outer side 52. The inner side 54 is partially received by and through the opening 40 as shown in FIG. 5.

The insert body 50 may be formed from a cushion material. In one example, the insert body 50 is formed from a plastic material. In a further example, the insert body 50 is formed from expanded polypropylene (EPP). In further examples, the insert body 50 may be formed from multiple layers of materials, including plastics or foams with different properties or densities to provide the desired cushion effect for an occupant.

The insert body 50 forms or defines one or more mounting surfaces 56. The mounting surfaces 56 extends around or across at least a portion of the insert body 50. The mounting surfaces 56 engage or mate with corresponding mounting surfaces 58 surrounding the opening 40 of the seat back frame or within the opening 40 of the frame 30. In the example shown, the mounting surfaces 56 are stepped, or have multiple surfaces, and extend along or across the inner side 54 of the insert 32.

The insert 32 has a retainer 60 extending outwardly from the insert body 50. The retainer 60 is spaced apart from the adjacent mounting face 56 as shown by region 62 of the mounting face 56, and the retainer 60 and mounting face 56 cooperate to form a channel 64 between the retainer 60 and the mounting face 56. The channel 64 is sized to receive a flange 42 of the frame 30 for use in retaining the insert 32 and trim cover 34 to the frame 30. When the insert 32 is positioned into the opening 40, the flange 42 of the seat back frame is received within the channel 64 such that the retainer 60 engages a surface 66 of the flange 42, shown as the rear surface 66 of flange 42 in FIG. 5.

In one example, the retainer 60 is integrally formed with the insert body 50, and the retainer 60 may be formed from a plastic such as expanded polypropylene (EPP). In another example, and as shown, the retainer 60 is a separate component and is connected to the insert body 50.

In one example, the retainer 60 is provided by a mounting frame 70 that is connected to the insert body 50. A first portion 72 of the mounting frame extends away from the insert body 50 to form the retainer 60. A second portion 74 of the mounting frame is connected to and may be positioned inside the insert body 50 to retain the mounting frame relative to the insert body. For example, the second portion 74 of the mounting frame may be molded into or embedded within the insert body when the insert body is being formed.

In one example, the mounting frame 70 is formed by an elongated bar. The elongated bar 70 may be formed from a metal or metal alloy. The elongated bar 70 has first and second end regions that provide the second portion 74 of the mounting frame and are embedded into the insert body. The elongated bar 70 has an intermediate region between the two end regions. At least a portion of the intermediate region may extend away from the insert body 50 or be spaced apart from the insert body to provide the first portion 72 of the mounting frame, e.g. the retainer.

The elongated bar 70 may be bent or otherwise shaped. In one example, the intermediate region forms a U-shape or tab region. In other example, the intermediate region may be formed into other shapes, or may be formed with multiple shapes in series, e.g. as two tabs or U-shapes that are spaced apart from one another to provide two retainer portions. In further example, the elongated bar may be formed with more than two tabs or U-shapes.

The retainer 60 may form one tab, two tabs or retainer portions 76, 78 as shown, or more than two tabs. For a retainer 60 with two retainer portions 76, 78, the first retainer portion 76 is spaced apart from and aligned with the second retainer portion 78. The first retainer portion 76 and the second retainer portion 78 cooperate with the mounting surface 56 to define the channel 64 therebetween. The flange 42 of the seat back frame is received within the channel defines by both retainer portions 76, 78 such that the first retainer portion 76 and the second retainer portion 78 engage the surface 66 of the flange 42.

In various examples, the insert body also forms or defines at least one projection 80 extending outwardly from the insert body 50. The insert body 50 may define a series of projections 80 as shown. The projections 80 or protrusions may be integrally formed with the insert body 50, and may generally extend outwardly from the inner side 54 of the insert body 50.

The projections 80 may be spaced apart from the retainer 60, and may be adjacent to the mounting face 56. The projections 80 are sized to extend through and be received by the opening 40 when the insert 32 is connected to the frame 30. The projections 80 engage the seat back frame 30 to aid in retaining the head restraint insert 32 relative to the seat back frame 30, for example, via an interference fit. The projections 80 may snap or otherwise fit into the pockets 48 of the frame 30. The projections 80 may aid in reducing movement of the insert body 50 relative to the frame 30 that may otherwise result in noise, vibration, and harshness caused by movement of the insert body 50 within the opening of the frame 30.

Figure 4:
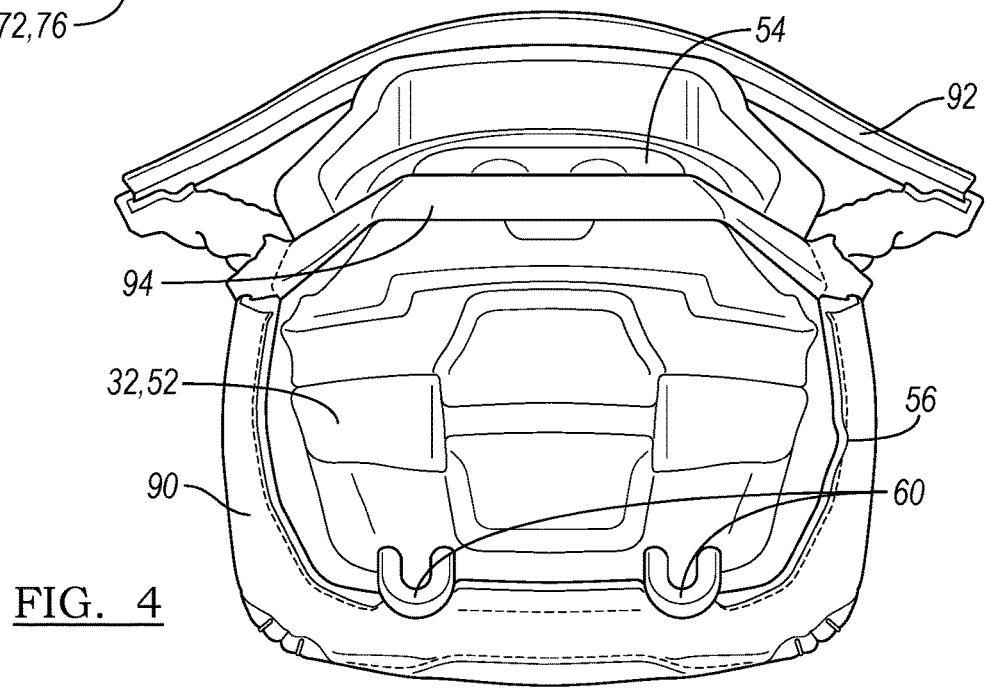
FIG. 4 illustrates a rear perspective view of a trim cover and the head restraint insert of FIG. 3.

A trim cover 90 is provided, and is shown in FIGS. 4-5. The trim cover 90 may be formed from a fabric. The trim cover 90 is sized to receive the insert body 50 such that the trim cover 90 extends over both a seating surface side 52 of the insert body 50 and at least some of the mounting surfaces 56.

The trim cover 90 may be formed as a pouch with an edge defining the outer perimeter. The trim cover 90 has an edge trim 92 extending about a portion of an outer perimeter region of the trim cover 90. The edge trim 92 is received by and cooperates with the lip 44 on the frame to retain the insert 32 and trim cover 90 to the seat back frame 30. The edge trim 92 may be positioned to be opposite to the retainer 60 when the trim cover 90 is installed on the insert body 50.

The edge trim 92 may be formed from a plastic material, for example, from a polypropylene or the like. In one example, the edge trim is 92 provided by a J-clip that is sewn or otherwise connected to the fabric of the trim cover 90 and extends about at least a portion of the outer perimeter of the fabric of the trim cover. The end of the J-clip or edge trim 92 is received by the groove 46 defined by the lip 44.

The trim cover 90 may additionally be provided with one or more elastic straps 94 that extend across the opening of the trim cover 90 and aid in locating and retaining the trim cover 90 to the insert body 50.

Additional layers of foam or padding 96 may additionally be inserted or provided within the trim cover 90 and between the trim cover and the seating side of the insert 32.

As shown in FIG. 5, the trim cover 90 is positioned within the channel 64 and between the mounting surface 56 and the flange 42 of the seat back frame when the head restraint insert 32 is connected to the seat back frame 30.

The positioning of the trim cover 90 between the mounting surface 56 and the flange 42, as well as the use of an edge trim 92, allows for the trim cover 90 to be retained in position by the head restraint insert body 50 and the seat back frame 30 without additional fasteners extending through the trim cover 90 and into the head restraint insert body 50. For example, conventional vehicle seat assemblies may use plastic push retainers, such as push rivets, fir tree fasteners, or the like that extend through apertures in the trim cover and into the insert body, and connect the trim cover to the underlying cushion. Use of push fasteners provides a more labor and time intensive installation of the trim cover compared to the trim cover according to the present disclosure. Additionally, the conventional vehicle seat assemblies require another fastener or fastening method to attach the cushion to the underlying frame in comparison to the present disclosure.

The trim cover 90, the insert body 50, and the retainer 60 allows for the connection of the head restraint insert 32 to the frame 30 without use of additional fasteners or complex assembly methods.

An assembly, such as a vehicle seat assembly 10, may be formed or assembled with a trim component, such as a head restraint insert 32, via a method according to the present disclosure. In other examples, various steps in the method may be omitted, added, rearranged into another order, or performed sequentially or simultaneously.

For the method, a support frame 30 is provided. The support frame 30 may be part of a vehicle seat assembly according to one example, or a vehicle seat back according to a further example. The support frame 30 has a flange 42 extending into an opening 40 surrounded by the support frame. The support frame 30 also forms a lip 44 extending away from the opening. The lip may be spaced apart from the flange.

An insert 32 is formed. The insert 32 may be a cushion or other trim component of a vehicle seat assembly according to one example, or a head restraint insert according to a further example. The insert 32 is formed with an insert body 50 and a retainer 60 extending outwardly from the insert body. The insert body 50 is formed with a mounting surface 56. The mounting surface 56 and the retainer 60 cooperate to define a channel 64 therebetween.

According to one example, the insert 32 is formed by positioning the retainer 60 into a mold. Material, such as a plastic, is then injected into the mold to form the insert body 50 such that a portion of the retainer 60 is embedded into the insert body.

Once the insert 32 is formed, at least a portion of the insert 32 is then inserted into a trim cover 90 such that the trim cover 90 extends over at least a portion of the mounting surface 56 and an outer side 52 of the insert body.

The insert 32 is connected to the support frame 30 by positioning the flange 42 of the support frame 30 into the channel 64 of the insert 32 with the trim cover 90 positioned between the flange 42 and the mounting surface 56. The retainer may be positioned into the recess 43 of the frame 30. The insert 32 and trim cover 90 are then rotated towards the support frame 30 until at least a portion of the insert 32 is received by the opening 40 and the retainer 60 engages a surface 66 of the flange 42. The insert 32 may be rotated until the projections 80 engage the corresponding pockets 48 of the frame 30, and the mounting surfaces 56 of the insert 32 are mated with the corresponding surfaces 58 of the frame 30.

The trim cover 90 is then stretched or extended over at least a portion of the support frame 30 such that an edge trim 92 provided in the trim cover 90 engages the lip 44 of the support frame. The trim cover 90 is retained by the insert 32 and the support frame 30 without the use of additional fasteners, such as push pin fasteners, or the like. Upon assembly, the retainer 60 causes interference between the retainer 60, trim cover 90, and any additional cushion inserts to complete assembly of the insert to the frame without the use of additional fasteners or steps.

While exemplary embodiments are described above, it is not intended that these embodiments describe all possible forms of the invention. Rather, the words used in the specification are words of description rather than limitation, and it is understood that various changes may be made without departing from the spirit and scope of the disclosure and the invention. Additionally, the features of various implementing embodiments may be combined to form further embodiments of the invention.

What is claimed is:

1. A vehicle seat assembly comprising:
   a seat back frame surrounding an opening, the seat back frame forming a flange extending into the opening, wherein the seat back frame forms a lip extending away from the opening, the lip extending about a portion of opening, the lip being opposite to the flange across the opening;
   a head restraint insert having an insert body sized to be at least partially received by the opening, wherein the insert body forms a mounting surface; and
   a trim cover sized to receive the head restraint insert such that the trim cover extends over a seating surface side of the insert body of the head restraint insert and the mounting surface, wherein the trim cover is positioned between the mounting surface and the flange of the seat back frame when the head restraint insert is connected to the seat back frame, wherein the trim cover has an edge trim extending about a portion of an outer perimeter region of the trim cover;
   wherein the edge trim is received by the lip to retain the trim cover to the seat back frame.

2. The vehicle seat assembly of claim 1 wherein the trim cover is retained in position by the head restraint insert and the seat back frame without fasteners extending through the trim cover and into the head restraint insert.

3. The vehicle seat assembly of claim 1 wherein the head restraint insert has a retainer extending outwardly from the insert body, wherein the mounting surface and the retainer define a channel therebetween, wherein the flange of the seat back frame is received within the channel.

4. The vehicle seat assembly of claim 3 wherein the head restraint insert has a mounting frame with a first portion forming the retainer, and a second portion positioned inside the insert body to retain the mounting frame relative to the insert body.

5. The vehicle seat assembly of claim 4 wherein the mounting frame is formed from an elongated bar, wherein the second portion of the mounting frame is formed by a first end region and a second end region of the elongated bar, and wherein the first portion is formed by an intermediate region of the elongated bar.

6. The vehicle seat assembly of claim 5 wherein the intermediate region forms a U-shape.

7. The vehicle seat assembly of claim 5 wherein the mounting frame is formed from metal.

8. The vehicle seat assembly of claim 3 wherein the retainer is formed by a first retainer portion and a second retainer portion, the first retainer portion spaced apart from and aligned with the second retainer portion, the first retainer portion and the second retainer portion cooperating with the mounting surface to define the channel therebetween, wherein the flange of the seat back frame is received within the channel such that the first retainer portion and the second retainer portion engage a surface of the flange.

9. The vehicle seat assembly of claim 3 wherein the insert body has at least one projection extending outwardly therefrom, the at least one projection spaced apart from the retainer, the at least one projection received by the opening and engaging the seat back frame to retain the head restraint insert relative to the seat back frame.

10. The vehicle seat assembly of claim 3 wherein the retainer is formed from plastic, and is integrally formed with the insert body.

11. The vehicle seat assembly of claim 1 wherein the insert body is formed from plastic.

12. The vehicle seat assembly of claim 11 wherein the insert body is formed from expanded polypropylene (EPP).

13. An assembly comprising:
   an insert body sized to be at least partially received within an opening of a frame, the insert body forming a mounting face extending around at least a portion of the insert body;
   a retainer extending outwardly from the insert body, the retainer spaced apart from the mounting face to form a channel therebetween, the channel sized to receive a flange of the frame to retain the assembly to the frame; and
   a trim cover sized to receive the insert body such that the trim cover extends over a first side of the insert body and the mounting face, the trim cover having an edge trim extending about a portion of an outer perimeter region of the trim cover to cooperate with a lip on the frame to retain the assembly to the frame, the edge trim positioned opposite to the retainer.

14. The assembly of claim 13 wherein the trim cover is retained in position relative to the insert body without fasteners extending through the trim cover and into the insert body.

15. The assembly of claim 13 wherein the insert body is formed from plastic; and
   wherein the retainer is formed from metal, a portion of the retainer embedded into the insert body to connect the retainer to the insert body.

16. The assembly of claim 15 wherein the retainer is formed from an elongated bar, the elongated bar having a first end region and a second end region embedded in the insert body, an intermediate region extending away from the insert body to form the retainer.

17. The assembly of claim 13 wherein the retainer is formed from an elongated bar, the elongated bar having a first end region and a second end region embedded in the insert body, and an intermediate region extending away from the insert body to form the retainer.

18. The assembly of claim 13 wherein the retainer is formed from by a first retainer portion and a second retainer portion, the first retainer portion spaced apart from and aligned with the second retainer portion, the first retainer portion and the second retainer portion cooperating with the mounting face to define the channel therebetween such that the first retainer portion and the second retainer portion engage a surface of the flange.

19. A method of forming an assembly with a trim component, the method comprising:
   providing a support frame with a flange extending into an opening surrounded by the support frame, the support frame forming a lip extending away from the opening, the lip spaced apart from the flange;
   providing an insert with an insert body and a retainer extending outwardly from the insert body, the insert body provided with a mounting surface, the mounting surface and the retainer cooperating to define a channel therebetween;
   inserting at least a portion of the insert into a trim cover such that the trim cover extends over the mounting surface and an outer side of the insert body;
   connecting the insert to the support frame by positioning the flange of the support frame into the channel of the insert with the trim cover positioned between the flange and the mounting surface, and rotating the insert towards the support frame until at least a portion of the insert is received by the opening and the retainer engages a surface of the flange; and
   extending the trim cover over at least a portion of the support frame such that an edge trim provided in the trim cover engages the lip of the support frame, wherein the trim cover is retained by the insert and the support frame.

20. The method of claim 19 wherein providing the insert further comprises forming the insert by positioning the retainer into a mold, and injecting material into the mold to form the insert body such that a portion of the retainer is embedded into the insert body.

* * * * *